(12) United States Patent
Nagai

(10) Patent No.: US 8,958,456 B2
(45) Date of Patent: Feb. 17, 2015

(54) WIRELESS COMMUNICATION DEVICE, WIRELESS COMMUNICATION SYSTEM, AND FREQUENCY ALLOCATION METHOD

(75) Inventor: Yukimasa Nagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/983,391

(22) PCT Filed: Feb. 14, 2012

(86) PCT No.: PCT/JP2012/053376
§ 371 (c)(1),
(2), (4) Date: Aug. 2, 2013

(87) PCT Pub. No.: WO2012/114937
PCT Pub. Date: Aug. 30, 2012

(65) Prior Publication Data
US 2013/0308685 A1 Nov. 21, 2013

(30) Foreign Application Priority Data
Feb. 24, 2011 (JP) ................................. 2011-038631

(51) Int. Cl.
*H04B 1/00* (2006.01)
*H04B 1/715* (2011.01)
(Continued)

(52) U.S. Cl.
CPC ............... *H04B 1/715* (2013.01); *H04W 72/02* (2013.01);
(Continued)

(58) Field of Classification Search
CPC ... H04W 88/06; H04W 16/14; H04W 72/085; H04W 88/02; H04W 72/02; H04W 52/243; H04B 1/715; H04B 2001/7154; H04B 1/713; H04B 1/7097; H04B 2001/7152; H04B 2201/709709; H04B 2201/71346

USPC ............ 375/133, 132, 260, 130, 141, E1.034, 375/E1.036, E1.033, E1.035; 455/114.2, 455/296, 115.1; 370/338, 329, 445, 333, 370/343, 320, 204, 431, 464
See application file for complete search history.

(56) References Cited

U.S. PATENT DOCUMENTS 7,006,451 B2 2/2006 Kuwahara
7,016,395 B2 3/2006 Watanabe et al.
(Continued)

FOREIGN PATENT DOCUMENTS

JP 2002-198867 * 7/2002 ............ H04B 1/713
JP 2002 198867 7/2002
(Continued)

OTHER PUBLICATIONS

"IEEE Std 802.15.2", Part 15.2: Coexistence of Wireless Personal Area Networks with Other Wireless Devices Operating in Unlicensed Frequency Bands, IEEE Computer Society, Total 126 Pages, (Aug. 2003).
(Continued)

*Primary Examiner* — Rahel Guarino
(74) *Attorney, Agent, or Firm* — Oblon, Spivak, McClelland, Maier & Neustadt, L.L.P.

(57) ABSTRACT

A composite wireless device including a WLAN device and a BT device. The composite wireless device includes a wireless-channel control unit that determines usable FH channels that can be used for frequency hopping of the BT device, based on communication quality information of the WLAN channel, and notifies the BT device of the usable frequency bands, and a BT-communication control unit that acquires communication quality information of an extended frequency band, which is a frequency band other than the usable frequency bands, as extended communication quality information. The wireless-channel control unit adds the FH channels in the WLAN channel, which are determined as being unused based on the extended communication quality information, as the usable FH channels.

15 Claims, 12 Drawing Sheets

(51) Int. Cl.
*H04W 72/02* (2009.01)
*H04W 88/06* (2009.01)
*H04W 16/14* (2009.01)

(52) U.S. Cl.
CPC .............. *H04W 88/06* (2013.01); *H04W 16/14* (2013.01)
USPC ........... 375/133; 375/132; 375/130; 375/141; 375/260; 375/E1.033; 375/E1.034; 375/E1.035; 375/E1.036; 455/114.2; 455/296; 455/115.1; 370/338; 370/329; 370/445; 370/333; 370/343; 370/320; 370/204; 370/431; 370/464

(56) References Cited

U.S. PATENT DOCUMENTS

| 2002/0080739 | A1 | 6/2002 | Kuwahara |
| 2013/0010830 | A1 | 1/2013 | Hori et al. |

FOREIGN PATENT DOCUMENTS

| JP | 3443094 | 6/2003 | | |
| JP | 2003 234745 | 8/2003 | | |
| JP | 3770586 | 2/2006 | | |
| JP | 2008 172556 | 7/2008 | | |
| JP | 2009 267678 | 11/2009 | | |
| JP | 2010 035179 | 2/2010 | | |
| JP | 2010-278764 | * 12/2010 | ............ H04W 16/14 |
| JP | 2010 278764 | 12/2010 | | |

OTHER PUBLICATIONS

International Search Report Issued Mar. 9, 2012 on PCT/JP12/053376 Filed Feb. 14, 2012.

* cited by examiner

FIG.11

| WLAN CHANNEL | UNUSABLE CHANNEL | FALSE-DETECTION DANGEROUS CHANNEL | CHANNEL COMMUNICATION QUALITY INFORMATION |
|---|---|---|---|
| CH1: 2401 MHz TO 2423 MHz | 2402 MHz TO 2422 MHz | 2402 MHz TO 2428 MHz | 70 |
| CH7: 2431 MHz TO 2453 MHz | 2432 MHz TO 2452 MHz | 2426 MHz TO 2458 MHz | 100 |
| CH13: 2461 MHz TO 2483 MHz | 2462 MHz TO 2482 MHz | 2456 MHz TO 2480 MHz | 80 |

WIRELESS COMMUNICATION DEVICE, WIRELESS COMMUNICATION SYSTEM, AND FREQUENCY ALLOCATION METHOD

FIELD

The present invention relates to a wireless communication device, a wireless communication system, and a frequency allocation method.

BACKGROUND

In 2.4-GHz band referred to as "ISM (Industry Science Medical) band", a user can use a wireless device without requiring any license, as long as the criteria defined in the Radio Act is satisfied. Therefore, in recent years, wireless devices using the 2.4-GHz band such as wireless LAN (Local Area Network) (the IEEE (the Institute of Electrical and Electronics Engineers) 802.11b/g/h), Bluetooth®, and cordless phones have been actively developed.

In a wireless device compliant to the IEEE 802.11b/g/h (hereinafter, "WLAN (Wireless LAN) device"), direct sequence spread spectrum (DSSS) and OFDM (Orthogonal Frequency Division Multiplexing) techniques have been introduced, taking noise immunity into consideration. In this regard, communication is performed by fixedly using one of previously-defined 14 channels in the 2.4-GHz ISM band (one channel has an occupied frequency bandwidth corresponding to about 20 channels of a Bluetooth® device).

Furthermore, taking interoperability with another network or another system into consideration, wireless access CSMA/CA (Carrier Sense Multiple Access with Collision Avoidance) has been mainly introduced, in which when respective wireless terminals perform carrier sense of a wireless channel prior to transmission of a wireless packet, and when having confirmed that a channel is being used (channel busy), the wireless terminal withholds transmission of the wireless packet, and transmits the wireless packet after the time lapse of a channel unused time (a channel idle time) and a back-off time predetermined for each frame type.

In a Bluetooth®-compatible wireless communication device (hereinafter, "BT device"), the noise immunity is similarly taken into consideration, and frequency hopping spread spectrum (FHSS) technique has been introduced. Further, a frequency hopping system in which among 79 frequency channels having predetermined 1-MHz width (hereinafter "FH channels") in a frequency band from 2.40 to 2.48 gigahertz, one FH channel is selected and switched with the passage of time to perform wireless communication has been adopted. In this frequency hopping system, a FH channel is selected so as to be repeated with a certain time interval (for example, 625 microseconds) based on a predetermined pseudo random algorithm, and one packet data is allocated to one FH channel to perform communication.

Therefore, if a BT device and a WLAN device that perform communication by using the same 2.4-GHz band are present in their respective communication areas, radio waves transmitted from respective devices interfere with each other, to interrupt respective communications. As a method of avoiding the radio wave interference, a technique referred to as "Adaptive Frequency Hopping: AFH" has been disclosed in Patent Literatures 1 and 2 mentioned below. This technique prevents interference from other systems such as the WLAN device by measuring a bit error rate (BER) or a packet error rate (PER) during transmission or measuring received signal strength in a slot in which communication is not being performed between BT devices to observe the quality of the FH channel on the BT device side (interference susceptibility from other systems such as the WLAN device), and performing frequency hopping, avoiding an FH channel in which a radio wave interfering its own communication is determined to be present.

For example, in the AFH technique, it is assumed that an FH channel determined such that there is no radio wave interrupting its own communication is a "good channel: Good", an FH channel determined such that there is a radio wave interrupting its own communication is a "bad channel: Bad", and an FH channel that cannot be determined is an "unknown channel: Unknown", and these channels are held in AFH_channel_map and AFH_channel_classification. The BT device then performs communication by using an FH channel as good as possible, by sharing the FH channel between a master station and a slave station by using LMP_set_AFH, which is a Link Manager Protocol, or the like.

However, because the conventional AFH technique mentioned above is performed, taking only the quality on the BT device side into consideration, considerable interruption may be caused in the communication between the WLAN devices by using an FH channel determined that there is no problem in the communication between the BT devices. For example, if a WLAN device falsely detects a signal outside a band transmitted from a BT device as a signal having a signal strength exceeding a predetermined threshold by performing carrier sense, the WLAN device waits before transmission even in a channel actually usable, thereby causing an unnecessary decrease in the communication throughput. Particularly, in a composite wireless device having both functions of the WLAN device and the BT device, the above problem becomes serious.

In the conventional AFH technique, further, when the use bandwidth of the WLAN device increases, the number of FH channels determined to be usable without any interruption by the BT device (good channels) becomes insufficient. Therefore, to satisfy the standard of the Bluetooth®, some of FH channels need to be used as usable channels, among the FH channels that do not satisfy the predetermined quality (bad channels) for the BT device due to interference with the WLAN device.

A method of avoiding deterioration of interference robustness of the BT device due to insufficient good channels is disclosed in paragraph 7 of Non Patent Literature 1 mentioned below and Patent Literature 3 mentioned below.

Furthermore, as a technique for avoiding interference between the BT device and the WLAN device described above, a method of controlling a transmission and reception timing of each BT device and WLAN device in a composite wireless device, in which both the WLAN device and the BT device are mounted on one wireless terminal, by mediating communication states between the BT device and the WLAN device, is disclosed in Non Patent Literature 1 mentioned below.

Further, Patent Literature 4 mentioned below discloses such a method that in a composite wireless device mounted with both the WLAN device and the BT device, the WLAN device itself ascertains not only an operating frequency of its own device but also channels used by other peripheral WLAN devices, and notifies the information to the BT device, so that the BT device selects an FH channel. Patent Literature 4 mentioned below further discloses a method of selecting an FH channel that can be used by the BT device based on communication timing information indicating the communication state of the WLAN device, such as an FH channel that cannot be used at a transmission timing of the WLAN device (an unusable channel at the time of transmission) according to the transmission and reception timing of the WLAN device, an FH channel that cannot be used at a carrier sense timing of the WLAN device (a false-detection risk channel), and an FH channel that cannot be used at a reception timing of the WLAN device (an unusable channel at the time of reception). Patent Literature 4 mentioned below also discloses such a method that FH channels are selected as quasi-usable FH channels from FH channels included in each WLAN channel predicted to be being used by other WLAN devices, excluding the false-detection risk channel corresponding to a WLAN channel to be used by, for example, its own WLAN device, in order from an FH channel farthest from a center frequency of the WLAN channel by alternately selecting an FH channel having a high frequency and an FH channel having a low frequency until the number of insufficient channels is reached, thereby compensating shortage of the number of good channels.

Patent Literature 5 mentioned below discloses a method in which a first wireless communication system transmits a CTS (Clear to Send) or an RTS (Request to Send)/CTS frame to reserve a communication band for a second wireless communication system, in order to ensure the communication band for the second wireless communication system.

CITATION LIST

Patent Literatures

Patent Literature 1: Japanese Patent No. 3443094
Patent Literature 2: Japanese Patent No. 3770586
Patent Literature 3: Japanese Patent Application Laid-open No. 2003-234745
Patent Literature 4: Japanese Patent Application Laid-open No. 2008-172556
Patent Literature 5: Japanese Patent Application Laid-open No. 2010-35179

Non Patent Literature

Non Patent Literature 1: IEEE Computer Society, "IEEE 802.15.2 specifications", August 2003

SUMMARY

Technical Problem

However, according to the techniques described in the conventional Patent Literatures and Non Patent Literature described above, in an environment in which a BT device and a WLAN device are close to each other (for example, in a composite wireless device mounted with a BT device and a WLAN device), a method of increasing the number of usable channels in the BT device when a communication state has been changed is not specified. Therefore, for example, a BT device in a composite wireless device selects an FH channel, avoiding interference with a peripheral WLAN device and thereafter, even if the peripheral WLAN device is not present due to movement, power cut, or the like, the BT device is forced to operate in the already selected and allocated FH channel, and thus the system throughput cannot be improved in cooperation with the WLAN device in its own wireless device.

The present invention has been achieved in order to solve the above problem, and an object of the present invention is to provide a wireless communication device, a wireless communication system, and a frequency allocation method that can improve system throughput, in a case where a BT device and a WLAN device are close to each other (for example, in a composite wireless device mounted with a BT device and a WLAN device), when there is no other WLAN device present due to movement, power cut, or the like.

Solution to Problem

A wireless communication device according to one aspect of the invention includes a first communication device that performs wireless communication by using a first frequency band selected from a plurality of first frequency bands, and a second communication device that performs communication by frequency hopping by using a plurality of second frequency bands in use frequency bands overlapping on the first frequency band. The wireless communication device further includes: a wireless-channel control unit that determines usable frequency bands, which are the second frequency bands usable for the frequency hopping, based on communication quality information of the first frequency band, and notifies the second communication device of the usable frequency bands; and an extended-quality-information acquisition unit that acquires communication quality information of an extended frequency band, which is a frequency band other than the usable frequency bands, as extended communication quality information. The wireless-channel control unit adds the second frequency bands in the first frequency band, which are determined as being unused based on the extended communication quality information, as the usable frequency bands.

Advantageous Effects of Invention

According to the present invention, in a case where a BT device and a WLAN device are close to each other, when there is no other WLAN device due to movement, power cut, or the like, system throughput can be improved.

BRIEF DESCRIPTION OF DRAWINGS

FIG. 11 is an example of use-channel information and channel communication quality information in a WLAN device.

DESCRIPTION OF EMBODIMENTS

Exemplary embodiments of a wireless communication device, a wireless communication system, and a frequency allocation method according to the present invention will be explained below in detail with reference to the accompanying drawings. The present invention is not limited to the embodiments.

Figure 1:
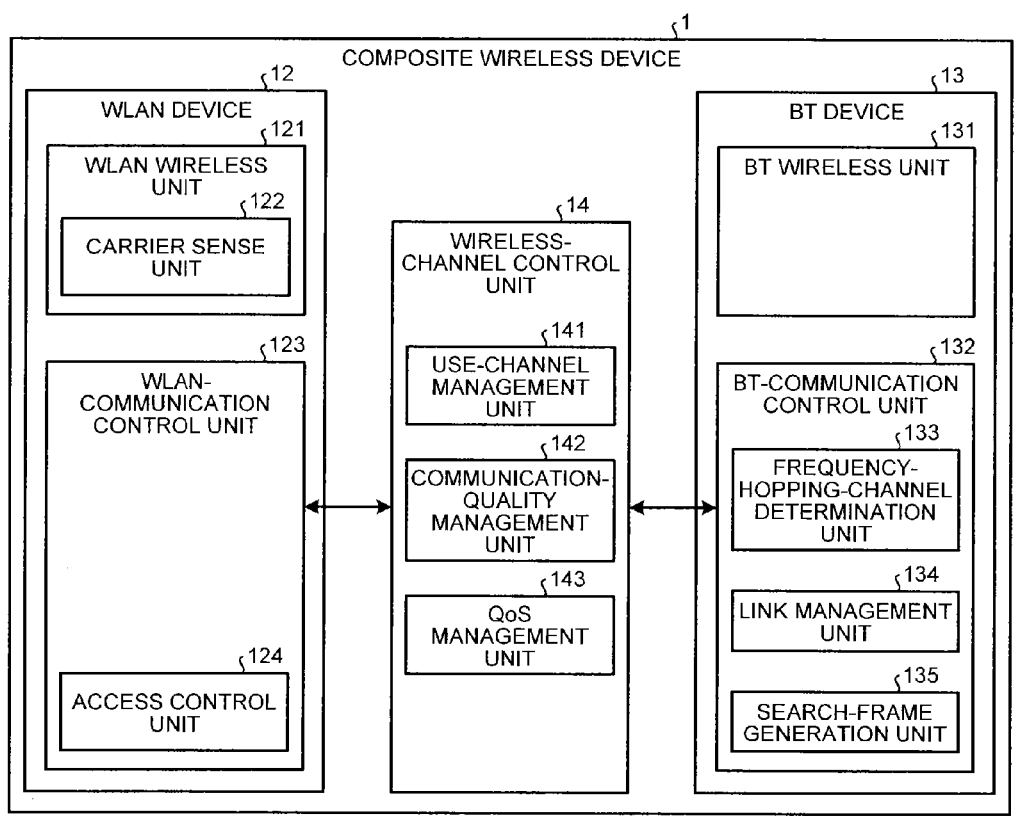
FIG. 1 is a functional configuration example of a composite wireless device.

FIG. 1 is a functional configuration example of a composite wireless device 1 according to the present invention. In the present embodiment, the composite wireless device 1 is explained as an example of a wireless communication device according to the present invention. As shown in FIG. 1, the composite wireless device 1 includes a WLAN device (first communication device) 12, a BT device (second communication device) 13, and a wireless-channel control unit 14.

Figure 2:
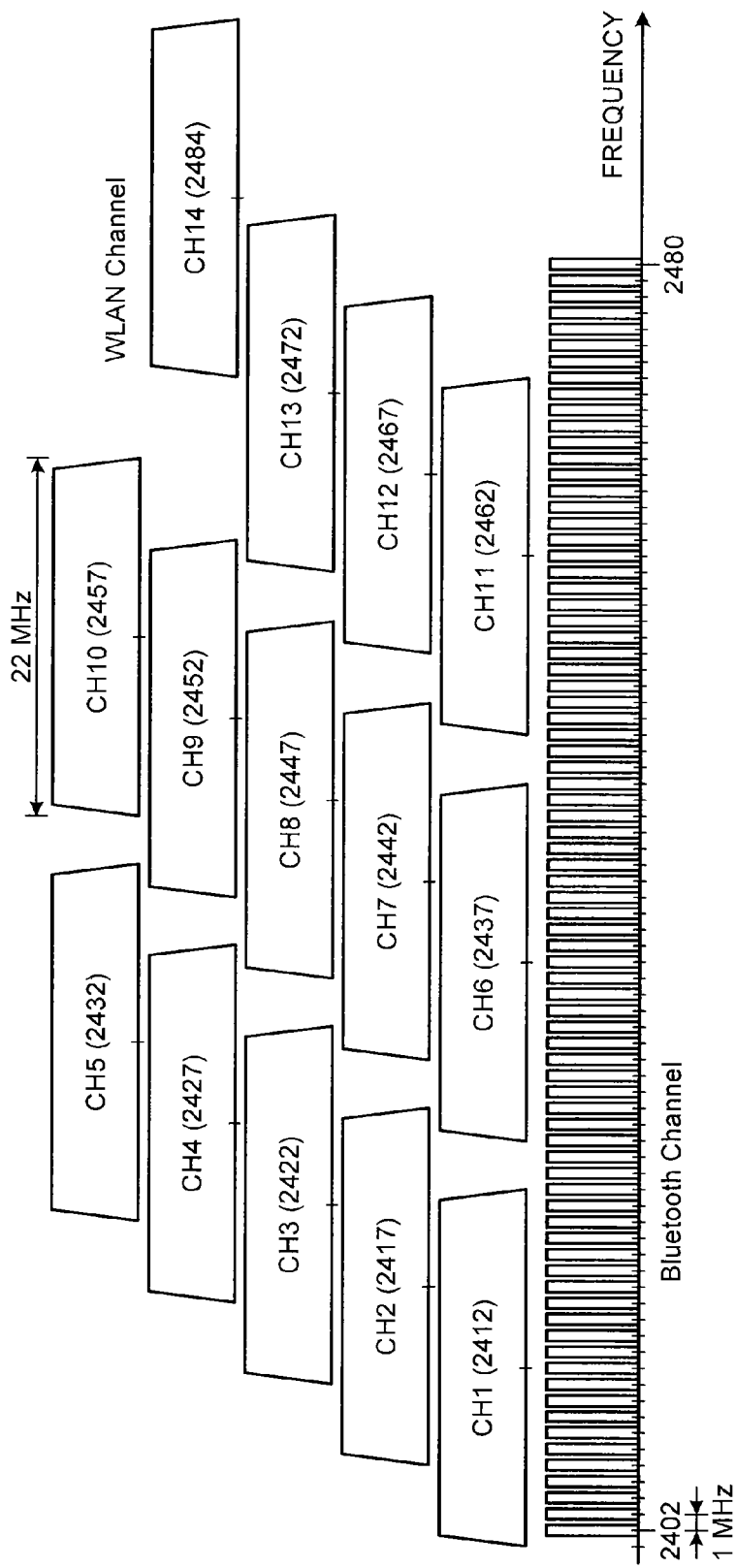
FIG. 2 is an example of a frequency band used by WLAN communication and BT communication.

FIG. 2 is an example of a frequency band used by WLAN communication and BT communication. Large trapezoids indicate frequency bands used by the WLAN device, and small rectangles indicate FH channels used by the BT device. In the WLAN communication, one or more arbitrary frequency channels of 14 frequency channels (first frequency band: hereinafter "WLAN channel") (CH1 to CH14 in FIG. 2) allocated in the 2.4-GHz frequency band with an interval of 5 megahertz compliant to the IEEE 802.11b/g/n are selected and used for communication. In the BT communication, one FH channel of 79 frequency channels (second frequency band: hereinafter "FH channels") (Bluetooth® Channel in FIG. 2) having a predetermined 1-MHz width in the frequency bands from 2.40 to 2.48 gigahertz is selected, and the FH channels are changed over along with a lapse of time to perform wireless communication.

The WLAN device 12 of the composite wireless device 1 has a function of performing the WLAN communication compliant to the IEEE 802.11b/g/n standard, and selects one or more arbitrary frequency channels of the 14 frequency channels (CH1 to CH14 in FIG. 2) allocated in the 2.4-GHz frequency band with an interval of 5 megahertz to be used for communication.

The BT device 13 has a function of performing the BT communication compliant to the Bluetooth® standard, and switches an FH channel to be used basically for each one time slot (625 microseconds), among the 79 FH channels (Bluetooth® channels in FIG. 2), based on a hopping pattern to perform communication.

A conventional interference avoidance technique when a WLAN device and a BT device are close to each other is explained. Because both the WLAN communication and the BT communication use 2.4 gigahertz, the WLAN device and the BT device may be an interference source to each other. The AFH technique is well-known as the technique for avoiding interference. However, since the AFH technique is performed, taking only the quality of the BT device into consideration, considerable interruption may be caused in the communication between the WLAN devices.

Figure 3:
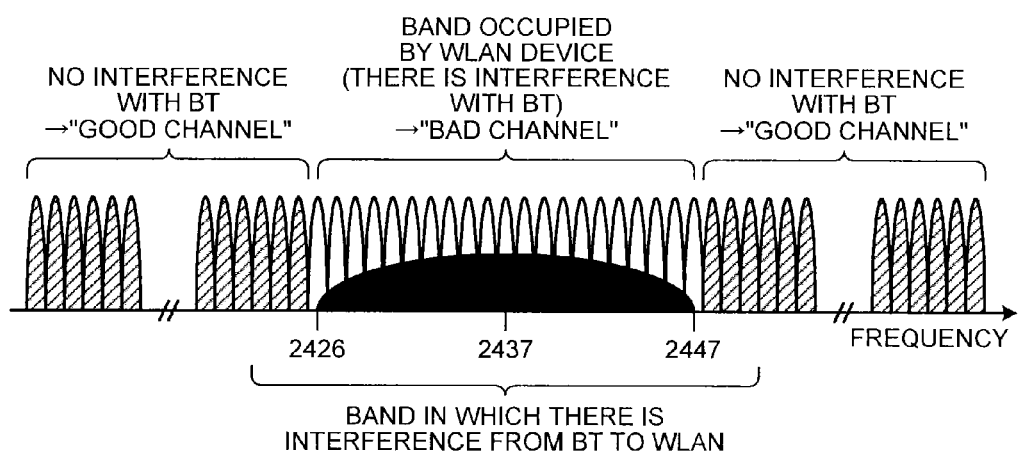
FIG. 3 is an arrangement example of FH channels, which have been determined whether to be usable or unusable by BT devices, and channels used by a WLAN device operating in a communication area between the BT devices, when a conventional AFH technique is used.

An example in such a case is explained with reference to FIG. 3. FIG. 3 is an arrangement example of FH channels, which have been determined whether to be usable or unusable by BT devices, and channels used by a WLAN device operating in a communication area between the BT devices, when a conventional AFH technique is used. In FIG. 3, FH channels in shaded portions indicate FH channels determined that the BT device is not interrupted and set usable (hereinafter "good channels"), blank channels indicate FH channels determined that the BT device will be interrupted or are currently interrupted and set unusable (hereinafter "bad channels"), and a black portion schematically indicates a signal spectrum transmitted or received by the WLAN device.

As shown in FIG. 3, the WLAN device transmits and receives a signal having an occupied frequency band of about ±10 megahertz around 2437 megahertz as a center frequency, and the BT device uses FH channels excluding the band of a signal sent from the WLAN device to perform communication.

Even if the BT device uses an FH channel outside of the use band of the WLAN device to transmit a signal, the WLAN device may falsely detect the signal outside of the band, which has been transmitted from the BT device, as a signal having a signal strength exceeding a predetermined threshold by carrier sense, in an environment in which the BT device and the WLAN device are close to each other. In this case, the WLAN device continues carrier sense without transmitting any signal even in a section in which the BT communication will not be actually interrupted even if the WLAN device transmits the signal (transmission is forced to wait due to CSMA/CA). Therefore, such a problem occurs that the communication throughput of the WLAN device decreases unnecessarily.

Figure 4:
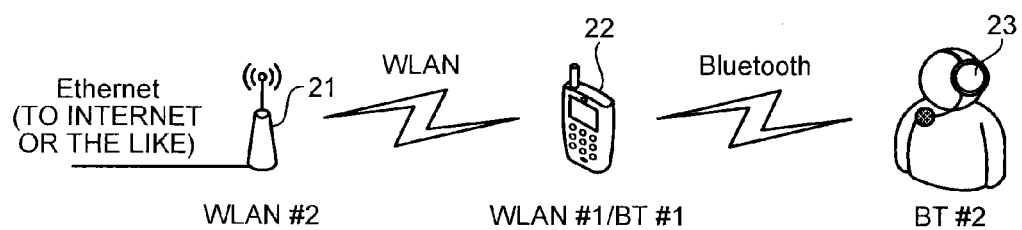
FIG. 4 is a configuration example of a communication system including a composite wireless device.

For example, such a system that BT communication is performed between a mobile phone and a headset, communication is performed between the mobile phone and an access point (AP), which is a WLAN device, according to the IEEE 802.11b/g/n, and communication is performed via an IP (Internet Protocol) line of the Internet has been studied. In such a system, a composite wireless device mounted with both the WLAN device and the BT device on one mobile terminal is used. FIG. 4 is a configuration example of a communication system including a composite wireless device. In an example in FIG. 4, a WLAN access point 21 connects to the Internet or the like by the Ethernet®, and includes a WLAN device #2 (hereinafter "WLAN #2") to perform WLAN communication with a mobile terminal 22. The mobile terminal 22, which is the composite wireless device, includes a WLAN device #1 to perform WLAN communication with the WLAN access point 21, and includes a BT device #1 (hereinafter "BT #1") to perform communication with a BT headset 23. The BT headset 23 includes a BT device #2 (hereinafter "BT #2") to perform BT communication with the mobile terminal 22.

Furthermore, in the Bluetooth® SIG (Special Interest Group), a system using a BT device together with a WLAN device, such as Bluetooth over WLAN has been also studied as Alternative PHY and MAC.

In such a composite wireless device, because the BT device and the WLAN device are arranged extremely close to each other, the problem of false detection described above due to carrier sense becomes more serious.

According to a conventional AFH technique, when the use band of the WLAN device increases, the number of good channels determined as being usable (available) without any interruption for a BT device becomes insufficient. Therefore, to satisfy the Bluetooth® standard, some FH channels among bad channels that do not satisfy a predetermined quality in the BT device due to interference with the WLAN device need to be selected as usable channels to be used.

Figure 5:
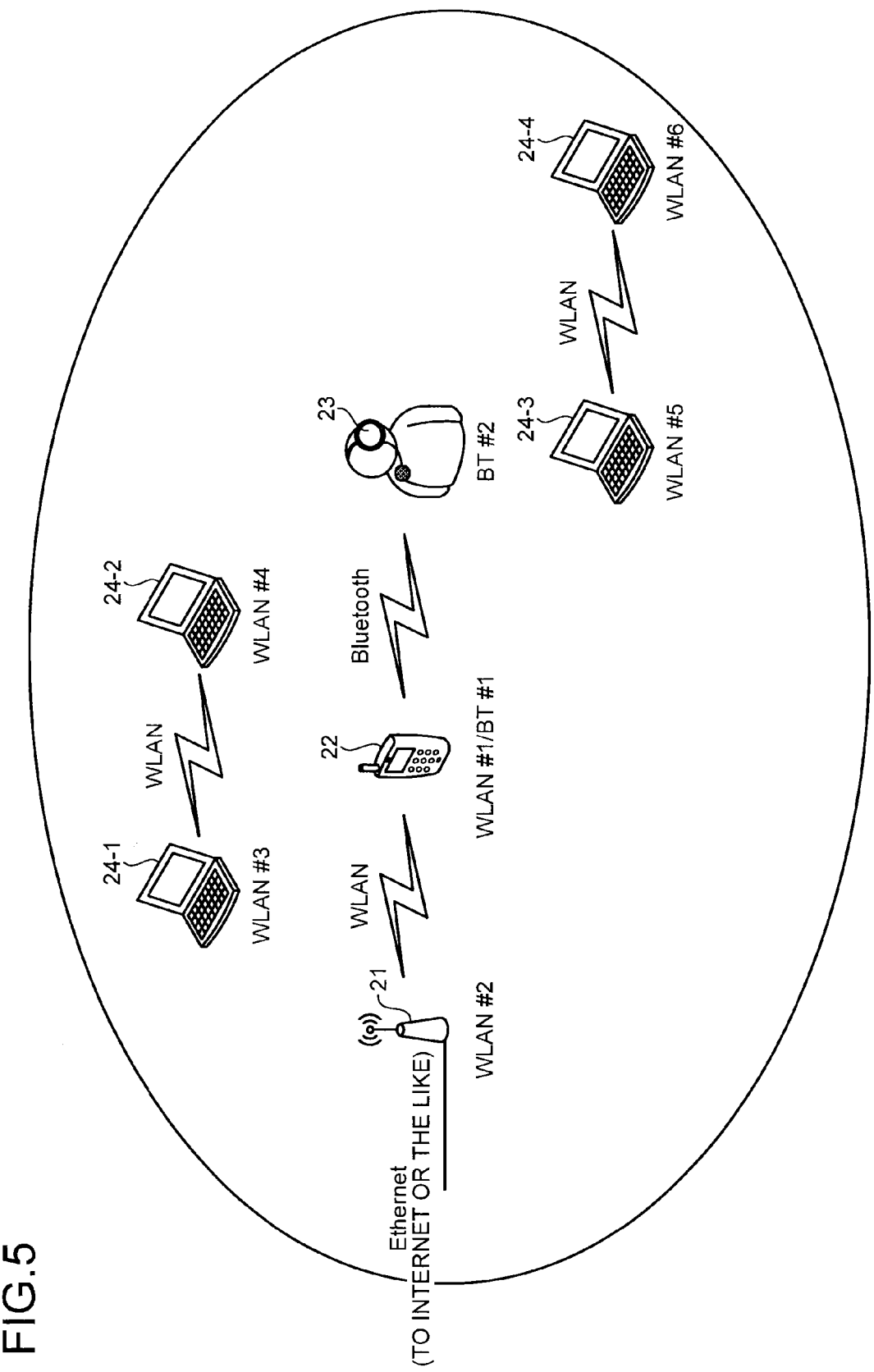
FIG. 5 is a configuration example of a communication system including a composite wireless device, a BT device, and a WLAN device.

This problem is explained with reference to the drawings. FIG. 5 is a configuration example of a communication system including a composite wireless device, a BT device, and a WLAN device. The WLAN access point 21, the mobile terminal 22, and the BT headset 23 are the same as those in FIG. 4. In the configuration example in FIG. 5, wireless LAN terminals 24-1 to 24-4 are further added to the communication system shown in FIG. 4. Wireless LAN terminals **24-*i*** (i=1, 2, 3, and 4) include WLAN devices #(2+i).

Figure 6:
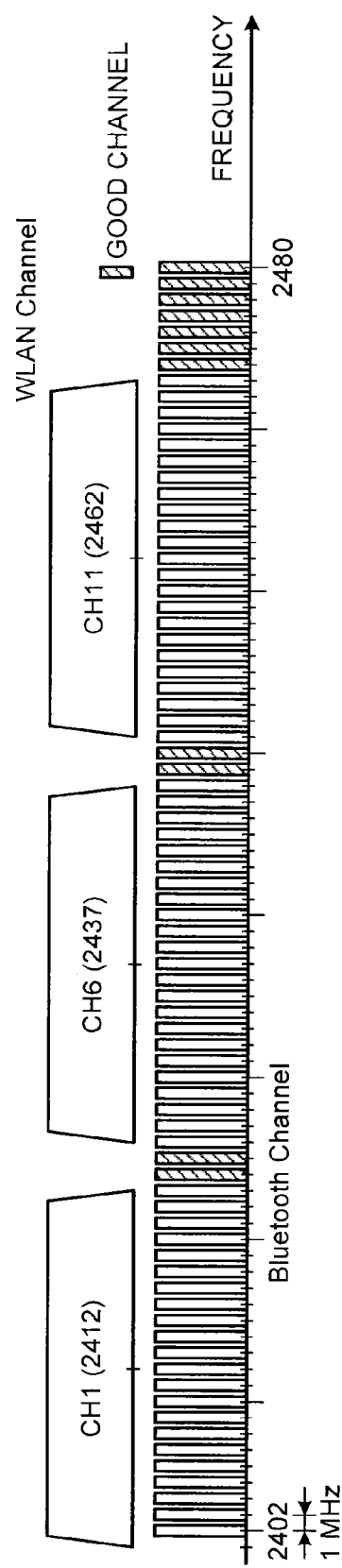
FIG. 6 is an example of a frequency band used by respective devices in the communication system shown in FIG. 5.

FIG. 6 is an example of frequency bands used by respective devices in the communication system shown in FIG. 5. Large trapezoids indicate frequency bands used by the WLAN devices, and small rectangles indicate FH channels used by the BT devices. For example, in the communication system shown in FIG. 5, it is assumed that WLAN devices #1 to #6 are respectively using channels CH1 (2401 to 2423 megahertz), CH6 (2426 to 2448 megahertz), and CH11 (2451 to 2473 megahertz) of the channels specified in the IEEE 802.11b/g/n to perform communication. In this case, if a conventional AFH technique is used, the BT #1 of the mobile terminal 22 uses 11 FH channels in total (FH channels in shaded portions in FIG. 6) including four FH channels having center frequencies at 2424 megahertz, 2425 megahertz, 2449 megahertz, and 2450 megahertz, and seven FH channels having the center frequencies between 2474 megahertz and 2480 megahertz as the good channels as frequency hopping frequencies.

Meanwhile, according to the FCC (Federal Communications Commission), it is defined that the number of frequency channels that perform hopping is equal to or more than 15 channels. Therefore, the BT #1 needs to select to use at least four or more channels from the bad channels so that the number of frequency channels that perform hopping becomes equal to or more than 15 channels, and thus the tolerance to interference waves from the WLAN communication deteriorates in the BT communication.

A method of solving the problem described above has been conventionally studied. However, in the conventional method, there is not specified a method of increasing the number of usable channels by the BT device after the BT device has selected FH channels to avoid interference with another peripheral WLAN device, when the communication state is changed due to absence of the another WLAN device. When the WLAN device, which has been an interference source, is not present any more due to movement, power cut, or the like, because unused channels increase, it is expected that the channels that may become the good channels for the BT device increase. However, in this case, conventionally, the BT device uses the already using channels as they are (does not increase the usable channels), and thus the wireless resource cannot be efficiently utilized.

According to the present embodiment, when the WLAN device, which has been an interference source, is not present due to movement, power cut, or the like, the system throughput is improved by detecting unused channels and using those unused channels detected by the BT device.

The detailed configuration of the composite wireless device according to the present embodiment is explained with reference to FIG. 1. The WLAN device 12 includes a WLAN wireless unit 121 including an antenna, a transmission and reception signal amplifier, a filter, a modulator and demodulator, a PLL (Phase Locked Loop) circuit, a baseband processing circuit, or the like, and a WLAN-communication control unit 123 including terminal management, confidentiality, a framer, an access control circuit, a scheduler, or the like. The WLAN device 12 also includes a host interface unit (not shown) for connecting to terminals and networks. The configurations of the WLAN wireless unit 121 and the WLAN-communication control unit 123 are not limited to the described example, and any configuration can be used as long as the WLAN wireless communication processing and communication control of the WLAN communication can be performed respectively.

The WLAN device 12 also includes a carrier sense unit 122 (for example, as a part of the baseband processing circuit) in the WLAN wireless unit 121. The carrier sense unit 122 performs carrier sense with respect to a designated WLAN channel based on an instruction from the WLAN-communication control unit 123, and notifies the WLAN-communication control unit 123 of the result as communication quality information.

For example, the carrier sense unit 122 detects a reception power level of the designated channel. When a detected value is equal to or lower than a predetermined threshold (for example, −76 dBm) within a predetermined time, the carrier sense unit 122 transmits a transmission OK signal indicating that the channel is unused and can be used to the WLAN-communication control unit 123 as the communication quality information. When the detected value is larger than the predetermined threshold within the predetermined time, the carrier sense unit 122 transmits information indicating that the channel is being used to the WLAN-communication control unit 123 as the communication quality information.

The carrier sense unit 122 can have two carrier sense levels as the predetermined threshold (a carrier sense level), that is, a carrier sense level with respect to a wireless frame having the same standard as its own device and a carrier sense level with respect to a frame from another system or a carrier sense level with respect to interference, so as to determine the communication quality information when it is not good by multiple levels (for example, two levels of "being used" and "with interference").

The WLAN-communication control unit 123 notifies the wireless-channel control unit 14 of the communication quality information of each WLAN channel acquired from the carrier sense unit 122. The WLAN-communication control unit 123 instructs the carrier sense unit 122 to perform carrier sense not only for the WLAN channel used by its own device but also for the WLAN channel used by other peripheral WLAN devices, thereby enabling to notify the wireless-channel control unit 14 of the communication quality information of the WLAN channel used by other peripheral WLAN devices.

The WLAN-communication control unit 123 includes an access control unit 124. The access control unit 124 is incorporated with access functions such as CSMA/CA, PCF (Point Coordination Function), EDCA (Enhanced Distributed Channel Access), and HCCA (Hybrid Coordination Function (HCF) Controlled Channel Access), and uses a different access function for each type of communication traffic.

The BT device 13 includes a BT wireless unit 131 including an antenna, an RF (Radio Frequency) circuit, a baseband processing circuit, or the like, and a BT-communication control unit 132 including a frequency-hopping-channel determination unit 133, a link management unit 134, a search-frame generation unit 135, an access control circuit, or the like. The BT device 13 also includes an interface unit (not shown) with a host controller. The configurations of the BT wireless unit 131 and the BT-communication control unit 132 are not limited to the above example, and any configuration can be used as long as the BT communication processing and communication control of the BT communication can be performed respectively.

The frequency-hopping-channel determination unit 133 performs AFH to determine channels to which frequency hopping is performed by using an AFH—channel—MAP.

The link management unit 134 manages a communication link with the BT device as a correspondent node. Specifically, the frequency-hopping-channel determination unit 133 measures a bit error rate, a packet error rate, an RSSI (a reception power level), an SINR (Signal to Interference plus Noise Ratio), a CINR (Carrier to Interference plus Noise Ratio) or the like to determine whether the BT communication satisfies the desired communication quality. The search-frame generation unit 135 transmits dummy data as required to search the state of each FH channel.

According to the present embodiment, the BT device 13 determines FH channels actually to be used for AHF by the frequency-hopping-channel determination unit 133 based on the usable FH channels acquired from the wireless-channel control unit 14. The frequency-hopping-channel determination unit 133 notifies the wireless-channel control unit 14 of the communication quality of the BT communication performed by the BT device 13 and band request information due to insufficiency of band associated with deterioration of the communication quality.

The wireless-channel control unit 14 includes a use-channel management unit 141 that manages channels used by the WLAN device 12 and the BT device 13, a communication-quality management unit 142 that holds and manages the channel quality information or the like notified from the WLAN device 12, and a QoS management unit 143 that performs predetermined QoS processing.

The operation according to the present embodiment is explained next. A case where the mobile terminal 22 in FIG. 5 is the composite wireless device 1 according to the present embodiment is explained as an example, assuming the configuration of the communication system shown in FIG. 5. The BT #1 provided in the mobile terminal 22, which is the composite wireless device 1, corresponds to the BT device 13 in FIG. 1, and the WLAN #1 provided in the mobile terminal 22 corresponds to the WLAN device 12 in FIG. 1.

Figure 7:
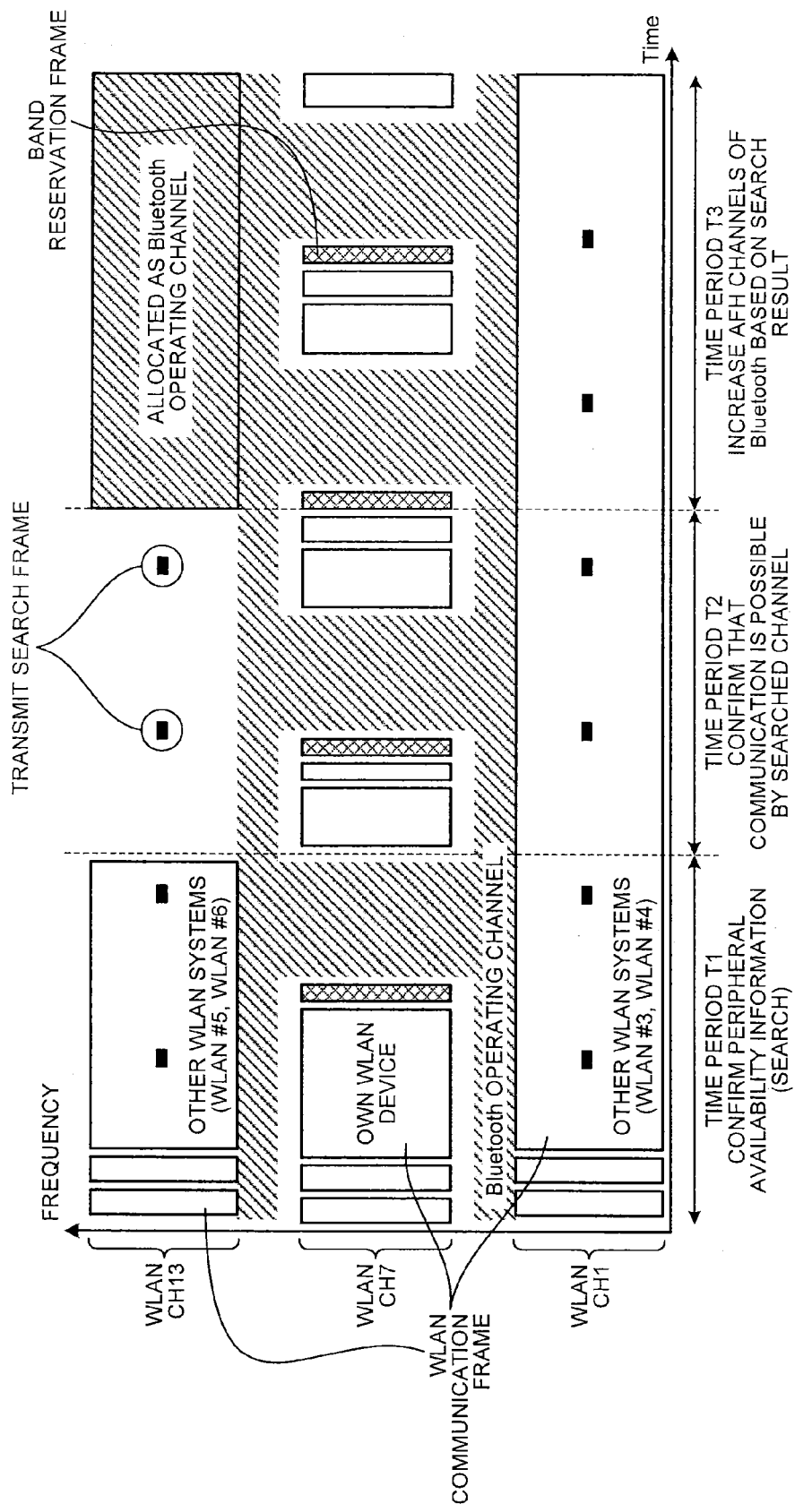
FIG. 7 is an example of usable frequencies and a time composition according to an embodiment of the present invention.
Figure 8:
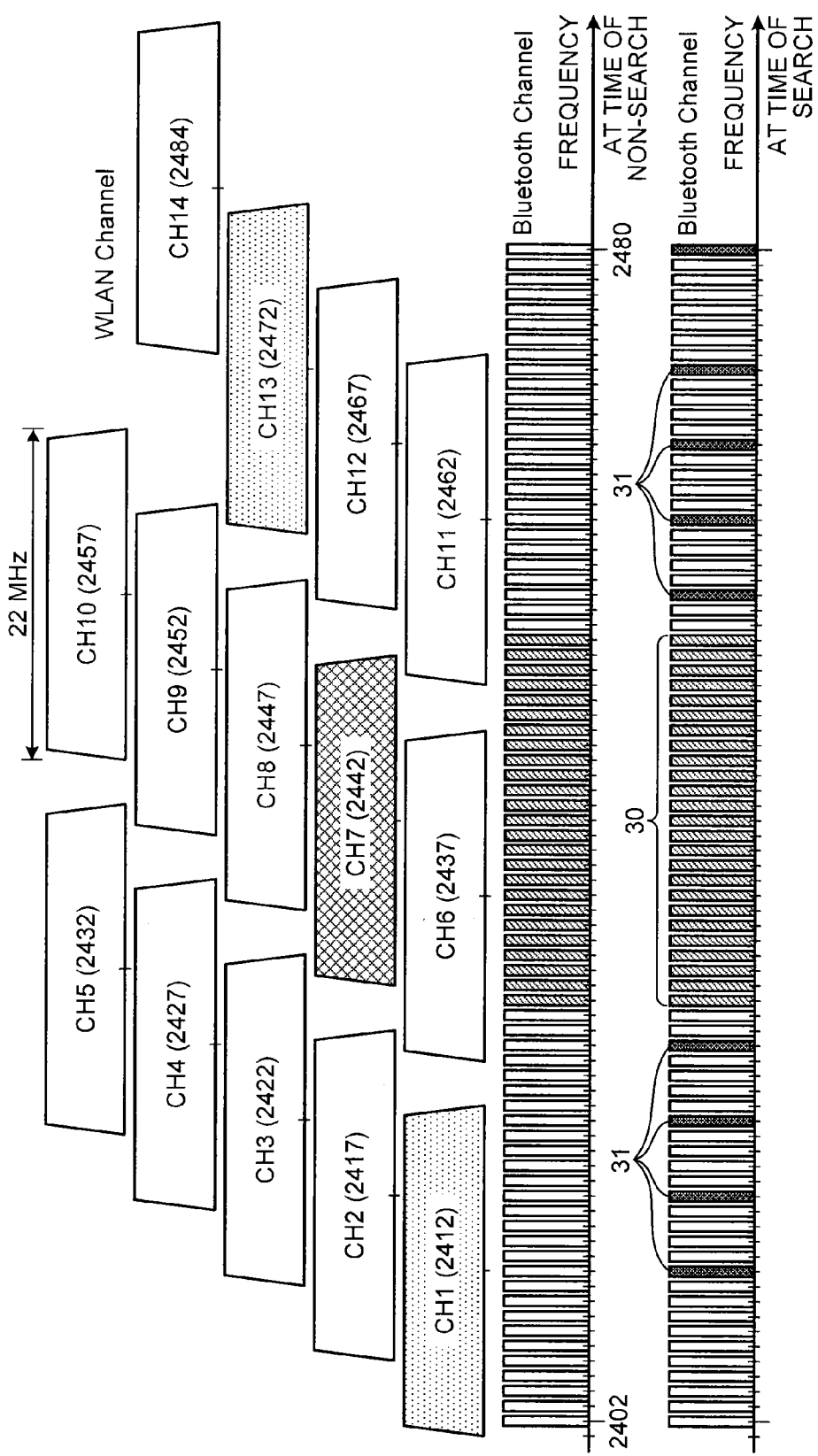
FIG. 8 is an example of a channel map according to the embodiment.

FIG. 7 is an example of usable frequencies and a time structure according to the present embodiment. FIG. 8 is an example of a channel map according to the present embodiment.

In the present embodiment, the composite wireless device 1 is described as a mobile phone. However, the composite wireless device 1 may be a game machine, a personal computer, a mobile router device, or a smart meter device, and is not limited to the mobile phone. In the present embodiment, an example in which the composite wireless device 1 operates as a WLAN terminal station. However, the composite wireless device 1 can have a function as a WLAN access point.

For example, the composite wireless device 1 can be a device having both the WLAN access point function and the Bluetooth® function. For example, the composite wireless device 1 can be a car navigation device, a mobile router device, a personal computer, a mobile phone device, or a smart meter device.

Figure 9:
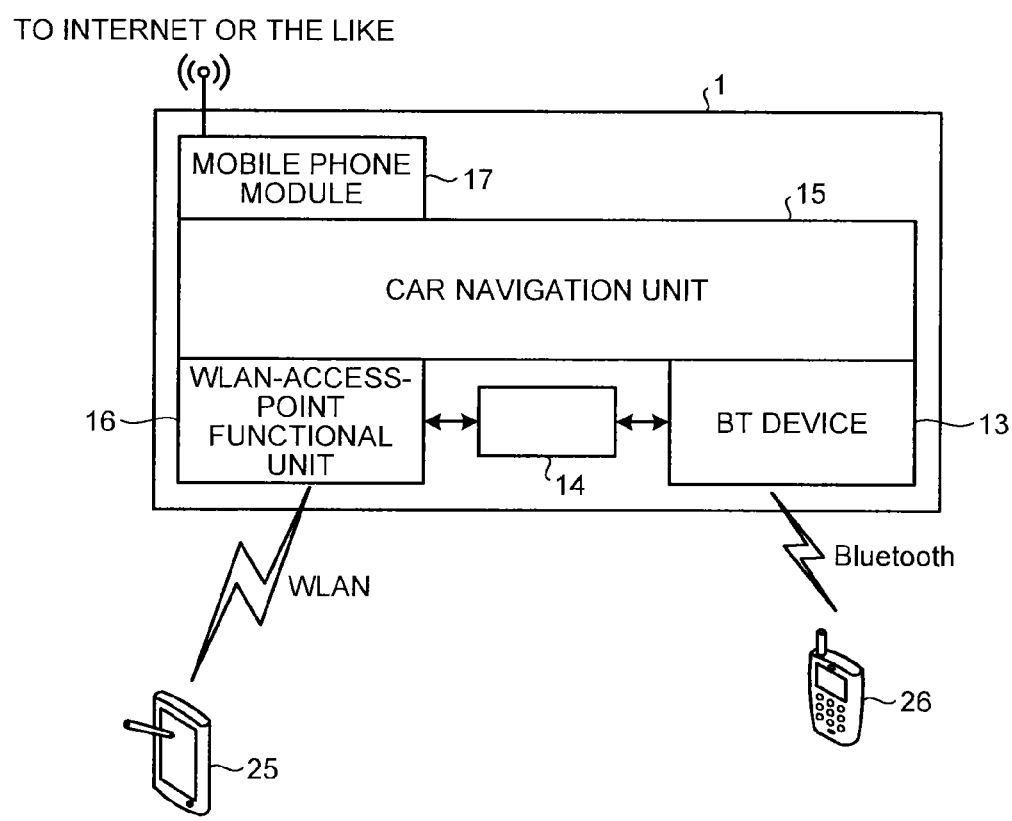
FIG. 9 is a configuration example of a case where the composite wireless device is a car navigation device and has a function as a WLAN access point.

FIG. 9 is a configuration example of a case where the composite wireless device 1 is a car navigation device having a function as the WLAN access point. In the example in FIG. 9, the composite wireless device 1 includes a car navigation unit 15, a WLAN-access-point functional unit 16, a mobile phone module 17 that connects to the Internet or the like by connecting to a mobile phone, the BT device 13, and the wireless-channel control unit 14. The BT device 13 and the wireless-channel control unit 14 are the same as those shown in FIG. 1, and the WLAN-access-point functional unit 16 is the same as the WLAN device 12 except that the WLAN-access-point functional unit 16 realizes the function as the WLAN access point instead of the WLAN terminal station.

The composite wireless device 1 in FIG. 9 performs WLAN communication with, for example, a portable device 25, which is a laptop computer, a tablet computer, or a game machine brought in a vehicle, and performs BT communication with a mobile terminal 26, which is a mobile phone, a mobile information terminal, or a terminal having both functions of the mobile phone and the mobile information terminal (a so-called "Smartphone").

An overall operation is explained next with reference to FIG. 7. FIG. 7 depicts frequency/time used by each wireless device in which a time is plotted on a horizontal axis, and a frequency band is plotted on a vertical axis. In FIG. 7, the frequency and time used for the WLAN communication frame are indicated by blank spaces. Its own WLAN in FIG. 7 corresponds to the WLAN #1, which is the WLAN device 12 provided in the composite wireless device 1 (the mobile terminal 22).

In a time period T1, the WLAN #1 of the composite wireless device 1 and the WLAN #2 of the WLAN access point 21 use a WLAN channel (CH) 7, the WLAN #3 of the wireless LAN terminal 24-1 and the WLAN #4 of the wireless LAN terminal 24-2 use a WLAN channel (CH) 13, and the WLAN #5 of the wireless LAN terminal 24-3 and the WLAN #6 of the wireless LAN terminal 24-4 use a WLAN channel (CH) 1 to perform communication.

Parts above and below the WLAN channel 7 (areas having frequency higher and lower than that of the WLAN channel 7) and the WLAN channel 7 of one part of time (areas hatched by diagonal lines) indicate a BT operating channel to be used for communication between the BT 1#1 of the composite wireless device 1 and the BT #2 as a correspondent node. In this manner, when the WLAN channels are used in a saturated state by the peripheral WLAN systems (here, WLAN #3 to WLAN #6), the communication band cannot be allocated sufficiently as the BT communication channels.

In this case, in the present embodiment, the WLAN #1 and the BT #1 of the composite wireless device 1 cooperate with each other to transmit, for example, a band reservation frame of the WLAN (a CTS-my-self frame or the like) prior to BT transmission (transmission in a diagonal cross-hatched area in FIG. 7), and allocate a communication band to be used by communication between the WLAN #1 and the WLAN #2 (hereinafter "own WLAN communication") as a BT communication channel for a certain time. After the certain time has passed, the WLAN device 12 performs communication for a certain time by using the WLAN channel 7, and allocates the WLAN channel 7 for BT communication after passage of the certain time. In this manner, the WLAN channel 7 is allocated alternately to its own WLAN communication and the BT communication. The certain time for performing its own WLAN communication and the certain time for performing the BT communication can be the same or different. For example, the certain time can be determined based on a communication amount of its own WLAN communication and a communication amount of the BT communication.

A method of allocating the WLAN channel 7 alternately to its own WLAN communication and the BT communication has been explained as an example. However, an allocation method of the FH channels (usable FH channels) to the BT communication when the communication band cannot be sufficiently allocated as the BT communicating channel is not limited thereto.

The BT #1 transmits a search frame for each usable FH channel at a constant frequency or as required. The search frame is for ascertaining a status of use of the channel based on the presence of a response frame with respect to the search frame or for acquiring the wireless communication quality by using the response frame. According to the present embodiment, as the state of the BT #1, two states are defined, that is, at "the time of non-search" and at "the time of search". At "the time of non-search", the BT #1 searches the reception state of each channel or the like, designating each of the FH channels as usable FH channels as a search target as in the conventional manner. On the other hand, at "the time of search", the BT #1 transmits a search frame, designating not only the usable FH channels set at "the time of non-search" but also the FH channels that are not set as the usable FH channels at "the time of non-search" as search targets. That is, at "the time of search", the search frame is transmitted for an extended search channel in which the channel as the search target is extended. Rectangular areas hatched in black in FIG. 7 correspond to transmission of a search frame for the BT #1 to search the wireless quality state of FH channels. It is at "the time of search", that is, when the channel as the search target is extended that a search frame is transmitted also for the WLAN channels being used by the WLAN #3 to WLAN #6. In FIG. 7, a state where the BT #1 is searching for the WLAN channel 1 and the WLAN channel 13 is shown; however, search is similarly performed for other WLAN channels.

When AFH is performed, the BT #1 monitors the wireless communication quality of the usable FH channels by, for example, transmitting the search frame regularly. According to the present embodiment, when determined that extended search is required, the BT #1 repeats a transition to "the time of search" regularly for a certain period (hereinafter "search duration") for every constant period (hereinafter, "search switching period").

For example, at "the time of non-search", the BT #1 performs search and frequency hopping, using a channel map (a channel map at "the time of non-search") based on the usable FH channels (for example, channels that are used by neither of its own WLAN communication nor the peripheral WLAN device) notified from the wireless-channel control unit 14 as a search channel map. Meanwhile, at "the time of search", the BT #1 switches the search channel map to a channel map (a channel map at "the time of search") corresponding to the extended search channels in which FH channels that have not been set as the usable FH channels are added to the FH channels are set as the usable FH channels. At the time point of switching to the channel map at "the time of search", because the usable FH channels have not been changed, frequency hopping for data transmission is performed by using the usable FH channels.

The FH channels to be added as the extended channels can be set in an area, for example, near the center frequency of the WLAN channel unused in its own WLAN communication. It is assumed here that the FH channels to be added are set beforehand in the BT device 13 or notified from the wireless-channel control unit 14.

In FIG. 8, the WLAN channel 7 and FH channels near the WLAN channel 7 are indicated as usable FH channels 30 at "the time of non-search". Furthermore, added FH channels 31, which are diagonally cross-hatched, are the FH channels added at the time of extending search target channels. In this example, FH channels near the center of the WLAN channels 1 to 6 and 8 to 14 excluding the WLAN channel 7 are added. However, because the FH channels near the center of the WLAN channels 5, 6, 8, and 9 are included in the usable FH channels at "the time of non-search", these channels are not indicated as the added FH channels.

As a trigger condition of a transition to a mode in which switching to "the time of search" is performed for each search switching period (hereinafter "extended search mode"), for example, a condition that the number of FH channels usable as the good channels becomes equal to or less than a predetermined number, or a condition that the quality of its own FH channels allocated already deteriorates can be included. The trigger condition is not limited thereto, and for example, any condition can be used, for example, deterioration of the WLAN channel quality in the WLAN #1 is set as the trigger condition. Conversely, any condition can be used as a return condition from the extended search mode to the normal state. However, the mode can be returned to the normal state, for example, when the communication amount of the BT #1 becomes equal to or less than a certain amount. Furthermore, the mode can be set to the extended search mode all the time, without providing the normal state.

As described above, in the Bluetooth®, hoping is performed based on a hopping pattern (at random based on a polynomial condition set beforehand) for every 625 microseconds. Therefore, when the search duration (once from the start of "the time of search" to the end of "the time of search" (a transition to at "the time of non-search")) is short or the communication amount of the Bluetooth® is small, even if it is changed to the channel map at "the time of search", the search frame corresponding to the added FH channels may not be transmitted. Therefore, it is desired to calculate the search duration time based on the number of channels added to the usable FH channels at "the time of non-search", which has been essentially usable, or the traffic amount of the BT #1. It is also desired to calculate the search switching period (a period from a start of "the time of search" to a start of "the time of search" next time) based on the number of added channels, the channel traffic amount of the BT #1, a transmission amount in the extended search channel, or the like.

According to the present embodiment, an FH channel which is added at "the time of search" and made to be a search target, is designated as an FH channel near the channel center of each WLAN channel. However, because the vicinity of the channel center is normally filtered so that a DC (Direct Current) component becomes low even in a WLAN transmission spectrum, an FH channel displaced upward and downward in a frequency direction from the center of the WLAN channel can be allocated.

Furthermore, search can be performed by using one FH channel per one WLAN channel, or each WLAN channel can be searched by using a plurality of FH channels. Further, only a specific WLAN channel can be searched by narrowing down a search area, for example, to the WLAN channels 1 to 3. Search can be also performed by using all the FH channels. Furthermore, transmission power at the time of transmission with respect to a specific FH channel can be optimized based on channel communication quality information of another WLAN system described later, so that no error occurs in a frame of the another WLAN system.

A time period T2 shown in FIG. 7 indicates a state where the WLAN terminals 24-3 and 24-4 have disappeared from the communication area of the composite wireless device 1. For example, when the composite wireless device 1 explained in the present embodiment is mounted on a vehicle, such a case can be mentioned that its own device has moved out from the surrounding hot spot area, or a vehicle including the same communication system and running side by side has disappeared from its own communication area. Likewise, when the composite wireless device 1 is a smart phone or the like, such a case can be mentioned that its own device has moved or a surrounding person holding a smart phone or a mobile router has moved.

In the time period T2, because the WLAN terminals 24-3 and 24-4 have disappeared from the communication area of the composite wireless device 1, even if the BT #1 uses an FH channel in the WLAN channel 1, which has been used by the WLAN terminals 24-3 and 24-4, no collision occurs. Furthermore, the BT #1 detects that the FH channel in the WLAN channel 1 is not being used for other communications, by transmitting a search frame in which the FH channels to be searched are extended.

Figure 10:
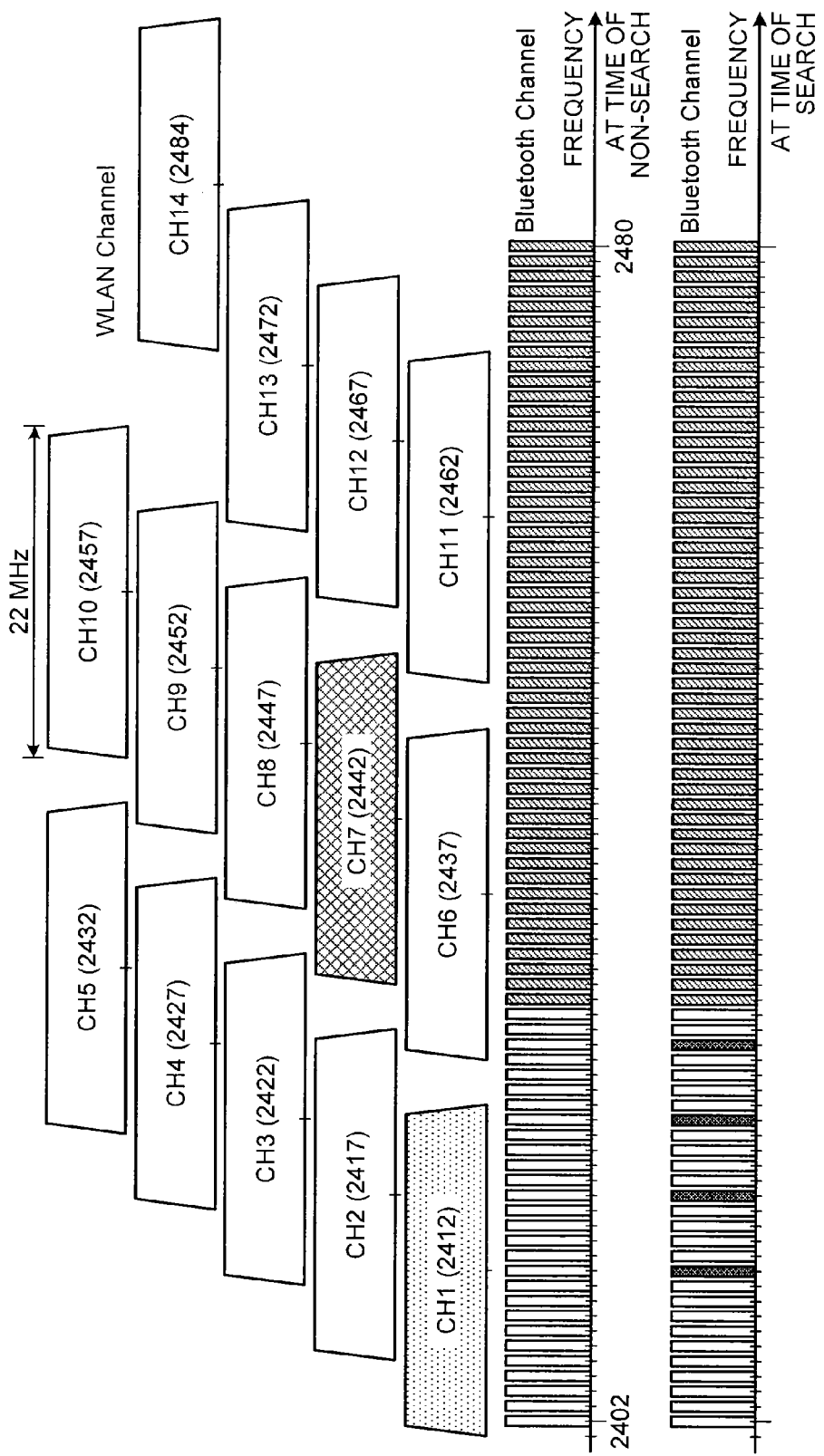
FIG. 10 is an example of search target channels at "the time of non-search" and at "the time of search" after the number of usable FH channels is increased.

When having detected that the FH channel in the WLAN channel 1 is not used for other communications continuously for a certain time or more or for a certain number of times, the BT #1 determines to add one or more FH channels in the WLAN channel 1 to the usable FH channels to be used for BT communication (to increase the FH channels). In the example shown in FIG. 7, when having detected that the FH channel in the WLAN channel 1 is not being used for other communications twice continuously by transmission of the search frame, the BT #1 increases the usable FH channels. The number of FH channels to be increased can be any number equal to or more than 1, and can be all the FH channels in the WLAN channel 1. In this manner, in a time period T3, the usable FH channels (AFH channels) are increased to perform communication. FIG. 10 is an example of search target channels at "the time of non-search" and at "the time of search" after the number of usable FH channels is increased.

At "the time of search", a search frame is transmitted to the FH channels excluding the already allocated channels (usable FH channels), out of the FH channels corresponding to the WLAN channels 1 to 14. However, the present embodiment is not limited thereto, and allocation of the channel map can be performed such that a plurality of FH channels per one WLAN channel are designated as search targets. Furthermore, for example, when a certain number or more of usable FH channels can be ensured, search can be stopped.

Operations of the respective devices in the composite wireless device 1 are explained below. First, the WLAN device 12 becomes a reception state after power on at a time 0 as a previous state of the state shown in FIG. 7, and then performs search about which WLAN channel is used for communication by the peripheral WLAN devices, by sequentially switching the WLAN channels to be received (performing channel scanning). Specifically, the WLAN-communication control unit 123 instructs the WLAN channel to be received sequentially to the carrier sense unit 122, and the carrier sense unit 122 acquires the communication quality information of the designated WLAN channel and notifies it to the WLAN-communication control unit 123.

The WLAN-communication control unit 123 determines a WLAN channel to be used for WLAN communication (its own WLAN communication) with a correspondent node, based on the communication quality information of each WLAN channel. The WLAN-communication control unit 123 notifies the wireless-channel control unit 14 of use-channel information (information of a channel to be used in its own WLAN communication and information of channels being used by other peripheral WLAN devices) and the channel communication quality information of all the WLAN channels. In the wireless-channel control unit 14, the use-channel control unit 141 notifies the BT device 13 of the usable FH channels based on the channel communication quality information of all the WLAN channels. In the BT device 13, the link management unit 134 acquires the communication quality information of each channel of the usable FH channels. The communication quality information acquired by the BT device 13 can include not only the information of the bit error rate, packet error rate, RSSI, SINR, and CINR, but also interfering/interfered information. Furthermore, as the communication quality information, a value or the like calculated based on a correlation value of a fixed pattern and received data can be used.

Further, the WLAN #2 having an access point function, which is a correspondent node, first becomes a reception state after power on, and can perform search about which WLAN channel is being used for communication by the peripheral WLAN devices, by sequentially switching the WLAN channels to be received (performing channel scanning), and can select a WLAN channel not being in use based on the interfering/interfered amount and the communication amount of other WLAN systems, to notify the WLAN device 12 of the WLAN channel.

When the WLAN channel to be used needs to be changed due to deterioration of the quality of the WLAN channel being used, the WLAN device 12 can change the WLAN channel to be used according to a predetermined protocol. In this case, the WLAN-communication control unit 123 re-outputs the usable channel information and the channel communication quality information to the wireless-channel control unit 14 every time there is a change in the WLAN channel to be used. The use-channel management unit 141 of the wireless-channel control unit 14 notifies the BT device 13 of any change of the usable FH channels.

An operation in the time period T1 in FIG. 7 is explained next. In the time period T1, for example, when the WLAN #2 as the WLAN access point 21 is operating in the WLAN channel 7 (at the frequency from 2431 megahertz to 2453 megahertz), the WLAN #2 is transmitting a Beacon of the WLAN channel V. The WLAN device 12 of the composite wireless device 1 receives the Beacon and performs connection control in order to operate as a terminal by using the WLAN channel 7, thereby performing data transfer.

In the time period T1, the WLAN #3 and the WLAN #4 are operating in the WLAN channel 1 (at a frequency from 2401 megahertz to 2423 megahertz), and the WLAN #5 and the WLAN #6 are operating in the WLAN channel 13 (at a frequency from 2461 megahertz to 2483 megahertz). Therefore, the WLAN device 12 reports the channel scanning result (a result indicating that the WLAN channels 1 and 13 are being used) to the wireless-channel control unit 14 as the use-channel information, taking a false-detection risk channel into consideration, and notifies the wireless-channel control unit 14 of the channel communication quality information indicating the interfering/interfered conditions based on the information of the bit error rate, packet error rate, RSSI, SINR, and CINR of each WLAN channel.

FIG. 11 is an example of use-channel information and channel communication quality information in the WLAN device 12. In FIG. 11, an example in which the WLAN channels 1, 7, and 13 are being used, assuming the period in the time period T1 shown in FIG. 7, and each of the channel communication quality information is shown. In the channel communication quality information, as the value becomes larger, it is indicated that the interfering/interfered amount is large, and the channel communication quality information of the WLAN channel 7 in which its own device is performing communication has the largest value. It also indicates that the interference decreases in the WLAN channel 1, and then in the WLAN channel 13 in this order.

In the example of FIG. 11, the information of the false-detection risk channel is shown for each WLAN channel. The false-detection risk channel, depends on the design value of the WLAN device, and can be preset in the WLAN device 12 and notified to the wireless-channel control unit 14 from the WLAN device 12, or can be set for each WLAN device in the wireless-channel control unit 14. Further, as described in the Patent Literature 4 mentioned above, not only the information of the false-detection risk channel but also the information of an unusable channel at the time of transmission and the information of an unusable channel at the time of reception can be set for each WLAN channel, and notified to the wireless-channel control unit 14 together with the use-channel information by the WLAN device 12. FIG. 11 is an example in which the unusable channels and the false-detection risk channels are set. However, only one of these can be set or neither of these may be used.

Furthermore, from the viewpoint of operations, when there is an FH channel in which it is not desirable that the BT device 13 performs communication, the use-channel management unit 141 can set the FH channel as an unusable channel beforehand.

The communication-quality management unit 142 holds the use-channel information and the channel communication quality information notified from the WLAN device 12, and the communication quality information notified from the BT device 13 as the quality management information. When the false-detection risk channel and the unusable channel are notified, these channels are also held as the quality management information, in association with each WLAN channel. The use-channel management unit 141 of the wireless-channel control unit 14 determines the usable FH channel that can be used by the BT device 13 for BT communication based on the quality management information held by the communication-quality management unit 142, and notifies the channel to the BT device 13.

The use-channel management unit 141 does not select FH channels in the WLAN channel, other than the channel being used for its own WLAN communication, of the channels notified as the use-channel information (the channels determined as being used), as the usable FH channels. Therefore, in the time period T1 in FIG. 7, the use-channel management unit 141 determines the upper and lower parts of the WLAN channel 7 being used for its own WLAN communication as the usable FH channels. However, the number of channels to be used for hopping, for example, which satisfies the FCC provisions, cannot be ensured only by these parts. Therefore, when having determined that BT communication needs to be performed based on the band request information from the BT device 13, the use-channel management unit 141 determines the FH channels in the WLAN channel 7 being used for its own WLAN communication and the upper and lower areas thereof as the usable FH channels. Before notifying the usable FH channels determined for the BT communication (before starting the BT communication), the use-channel management unit 141 instructs to transmit a band reservation frame indicating not to use the WLAN channel 7 during the BT communication. Thereafter, as explained with reference to FIG. 7, the WLAN channel 7 is allocated alternately to the BT communication and its own WLAN communication.

According to the present embodiment, the composite wireless device 1 allocates the WLAN channel 7 used for its own WLAN communication and the upper and lower (peripheral) FH channels to the BT device 13 as the usable FH channels at a regular time interval. However, the allocation is not limited thereto, and for example, when the value of the channel communication quality information of the WLAN channel being used by its own WLAN system is small, that is, when it can be presumed that other WLAN systems are present away from its own system, as shown in FIG. 12, the FH channels in the WLAN channel can be allocated as the usable FH channels.

Figure 12:
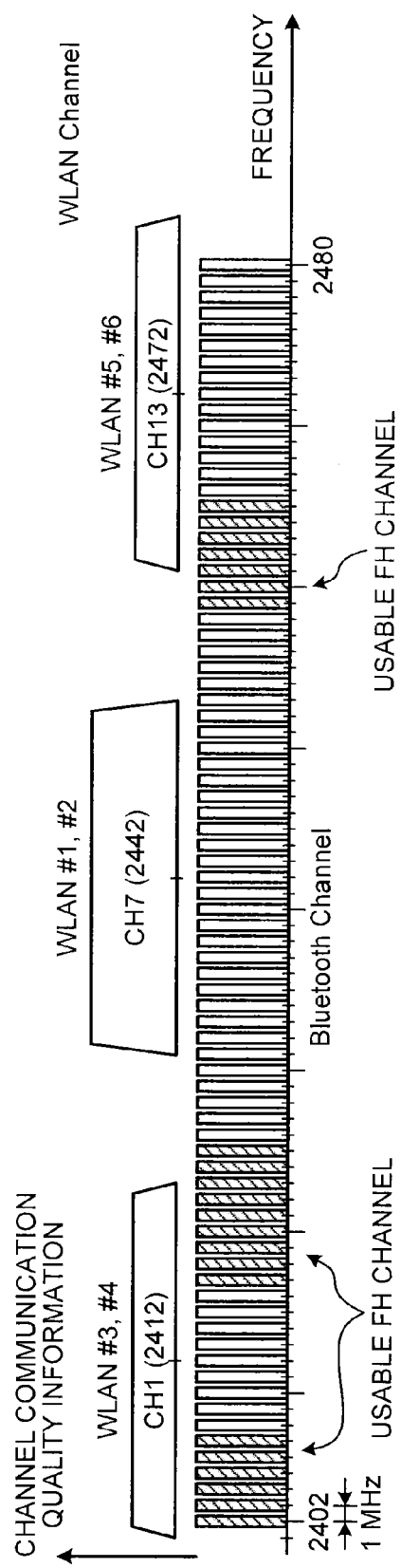
FIG. 12 is an example of a case where an FH channel in a WLAN channel being used by another WLAN system is allocated as a usable FH channel.

FIG. 12 is an example of a case where FH channels in a WLAN channel being used by another WLAN system are allocated as usable FH channels. In FIG. 12, an example in which its own WLAN uses the WLAN channel 7, the WLAN devices #3 and #4 use the WLAN channel 1, and the WLAN devices #5 and #6 use the WLAN channel 13 is shown, assuming the configuration example of FIG. 5. Furthermore, an example in which when the value of the channel communication quality information becomes smaller than a predetermined value due to the presence of the WLAN devices #3, #4, #5, and #6 sufficiently away from the composite wireless device 1, the channels of the WLAN devices #3, #4, #5, and #6 are determined to be usable channels (areas hatched by diagonal lines) is shown.

The frequency hopping-channel determination unit 133 of the BT device 13 performs frequency hopping communication by using the usable FH channels notified from the wireless-channel control unit 14. Further, the search-frame generation unit 135 of the BT device 13 transmits a search frame regularly or as required, based on the channel map at "the time of non-search" (a search channel map) or the channel map at "the time of search" (a search channel map corresponding to the extended search channel).

As in the time period T2 in FIG. 7, when having detected that the WLAN devices #1 and #2 are not present (the WLAN channel 1 is not being used) by the search frame transmitted corresponding to the extended search channel, the link management unit 134 notifies the wireless-channel control unit 14 of this matter. The wireless-channel control unit 14 adds the FH channels in the WLAN channel 1 as the usable FH channels based on the notification, and notifies the BT device 13 of the usable FH channels after the addition. The hopping-channel determination unit 133 of the BT device 13 uses the usable FH channels after the WLAN channel 1 is added to perform frequency hopping communication (the time period T3 in FIG. 7).

At "the time of search", the search frame is transmitted corresponding to the extended search channel. However, at this time, if normal communication and audio communication are allocated as the search frame, data, audio frame, or the like may collide with communication data or the like of other WLAN systems, and thus re-transmission may be required, or in the case of audio, noise may be generated. Therefore, a dummy frame generated by the search-frame generation unit 135 can be transmitted for the added channels of the extended search channels. For example, by using a multi-profile function of the Bluetooth®, at "the time of search", audio data using a conventional SCO (Synchronous Connection Oriented/eSCO (extended SCO) can be generated, and the dummy data by ACL can be superposed on the audio data by using the search channel. For the added channels of the extended search channels, dummy data can be transmitted. According to this method, the presence of the other peripheral WLAN systems can be confirmed, while ensuring the communication quality with respect to the audio communication.

As described above, the composite wireless device 1 detects availability near the WLAN channel 13, which has been used by other WLAN systems (WLAN devices #5 and #6), and can extend the usable FH channels, which have been insufficient to the BT device 13 of its own system.

According to the present embodiment, the search channel map is switched between "the time of non-search" and "the time of search", to detect the communication state of the peripheral WLAN devices based on the transmission result of the search frame with respect to the extended search channels at "the time of search". That is, the BT-communication control unit 132 of the BT device 13 functions as an extended-quality-information acquisition unit that acquires the communication quality information of the channels added as the extended search channels. Meanwhile, the detection method of the communication state of the peripheral WLAN devices is not limited thereto.

For example, in a state where the composite wireless device 1 allocates a part of its own communication band to the BT device by using the band reservation frame, in the BT communication period after the band reservation frame, the carrier sense unit 122 of the WLAN device 12 scans the WLAN channels according to an instruction from the wireless-channel control unit 14, notifies the scanning result to the wireless-channel control unit 14, and the wireless-channel control unit 14 can detect whether there is another WLAN device based on the scanning result. When having determined that there is no other WLAN system based on the detection result, the wireless-channel control unit 14 increases the usable FH channels and notifies the BT device 13 of the increased usable FH channels. In this case, the carrier sense unit 122 functions as the extended-quality-information acquisition unit.

In the present embodiment, a case where the WLAN device 12, the BT device 13, and the wireless-channel control unit 14 are mounted on one composite wireless device 1 has been explained. However, the configuration can be such that the respective devices are formed as separate devices, arranged in adjacent places, and connected to each other by a fixed line or the like.

As described above, according to the present embodiment, when the BT device 13 and the WLAN device 12 are close to each other, the frequency bands other than the usable FH channels allocated to the BT device 13 are searched. When there is an unused channel based on the search result, the unused channel is added to the usable FH channels. Therefore, when the BT device 13 and the WLAN device 12 are close to each other, the unused channel can be effectively utilized when another WLAN device disappears due to movement or power cut. Further, in the composite wireless device 1, when the usable FH channels are insufficient, a part of the communication time of the WLAN channel being used for its own WLAN communication is allocated to the BT communication. However, when the FH channels can be sufficiently ensured for the BT communication by the addition of the usable FH channels, it is not necessary to allocate the WLAN channel being used for its own WLAN communication to the BT communication. Accordingly, respective devices can use different operating channels in cooperation with each other, and the system throughput can be maximized.

REFERENCE SIGNS LIST 1 composite wireless device
12 WLAN device
13 BT device
14 wireless-channel control unit
121 WLAN wireless unit
122 carrier sense unit
123 WLAN-communication control unit
124 access control unit
131 BT wireless unit
132 BT-communication control unit
133 frequency-hopping-channel determination unit
134 link management unit
135 search-frame generation unit
15 car navigation unit
16 WLAN-access-point functional unit
17 mobile phone module
21 WLAN access point
22, 26 mobile terminal
23 BT headset
24-1 to 24-4 wireless LAN terminal
25 portable device
30 usable FH channel
31 added FH channel

The invention claimed is:

1. A wireless communication device comprising:
a first communication device that performs wireless communication by using a first frequency band selected from a plurality of first frequency bands;
a second communication device that performs communication by frequency hopping by using a plurality of second frequency bands that overlap on the first frequency bands;
a wireless-channel control unit that determines usable frequency bands, which are the second frequency band usable for the frequency hopping, based on communication information of the first frequency bands; and
an extended-quality-information acquisition unit that acquires communication quality information of an extended frequency band, which is a frequency band in the first frequency bands and other than the usable frequency bands, as extended communication quality information, after determination of the usable frequency bands by the wireless-channel control unit, wherein
the wireless-channel control unit adds frequency bands determined as not being used based on the extended communication quality information, as the usable frequency bands, and
the extended-quality-information acquisition unit acquires the extended communication quality information for every constant period determined based on at least one of the extended frequency band and a traffic amount of the second communication device.

2. The wireless communication device according to claim 1, wherein the second communication device includes the extended-quality-information acquisition unit.

3. The wireless communication device according to claim 2, wherein the extended frequency band is set as one second frequency band, which is close to the center frequency of the first frequency band, in which the frequency does not overlap on the usable frequency bands.

4. The wireless communication device according to claim 2, wherein the extended frequency band is set as one second frequency band, which is away by certain frequencies from the center frequency of the first frequency band, in which the frequency does not overlap on the usable frequency bands.

5. The wireless communication device according to claim 2, wherein the extended frequency band is set as at least two second frequency bands near the center frequency of the first frequency band, in which the frequency does not overlap on the usable frequency bands.

6. The wireless communication device according to claim 2, wherein the extended frequency band is set as all the second frequency bands, in which the frequency does not overlap on the usable frequency bands, of all the second frequency bands.

7. The wireless communication device according to claim 2, wherein the extended-quality-information acquisition unit transmits a search frame in the extended frequency band and acquires the extended communication quality information based on a response to the search frame.

8. The wireless communication device according to claim 7, wherein the extended-quality-information acquisition unit transmits the search frame with transmission power, with which it is assumed that no error occurs in first communication using the first frequency band, based on the communication quality information of the first frequency band corresponding to the extended frequency band.

9. The wireless communication device according to claim 1, wherein the predetermined time is determined based on at least one of the extended frequency band and the traffic amount of the second communication device.

10. The wireless communication device according to claim 1, wherein the extended-quality-information acquisition unit acquires the extended communication quality information when the number of second frequency bands determined as the usable frequency bands becomes equal to or less than a predetermined threshold or when wireless quality of the second frequency bands determined as the usable frequency band deteriorates.

11. The wireless communication device according to claim 1, wherein the extended-quality-information acquisition unit acquires the extended communication quality information when the wireless communication quality of the first frequency band being used by the first communication device deteriorates.

12. The wireless communication device according to claim 1, wherein the first communication device includes the extended-quality-information acquisition unit.

13. The wireless communication device according to claim 12, wherein
the wireless-channel control unit allocates the first frequency band being used by the first communication device alternately to the first communication device and the second communication device, when the number of second frequency bands determined as the usable frequency bands is equal to or less than a predetermined threshold, and
the extended-quality-information acquisition unit acquires the extended communication quality information in a period of time during which the first frequency band is allocated to the second communication device.

14. A wireless communication system comprising:
a first communication device that performs wireless communication by using a plurality of first frequency bands;
a second communication device that performs communication by frequency hopping by using a plurality of second frequency bands that overlap on the first frequency band;
a wireless-channel control unit that determines usable frequency bands, which are the second frequency bands usable for the frequency hopping, based on communication information of the first frequency band, and notifies the second communication device of the usable frequency bands, wherein
the first communication device includes an extended-quality-information acquisition unit that acquires communication quality information of an extended frequency band, which is a frequency band in the first frequency bands other than the usable frequency bands, as extended communication quality information, after determination of the usable frequency bands by the wireless-channel control unit,
the wireless-channel control unit adds the frequency bands determined as being unused based on the extended communication quality information, as the usable frequency bands, and
the extended-quality-information acquisition unit acquires the extended communication quality information for every constant period determined based on at least one of the extended frequency bands and a traffic amount of the second communication device.

15. A wireless communication system comprising:
a first communication device that performs wireless communication by using a plurality of first frequency bands;
a second communication device that performs communication by frequency hopping by using a plurality of second frequency bands that overlap on the first frequency band;
a wireless-channel control unit that determines usable frequency bands, which are the second frequency bands usable for the frequency hopping, based on communication information of the first frequency band, and notifies the second communication device of the usable frequency bands, wherein
the second communication device includes an extended-quality-information acquisition unit that acquires communication quality information of an extended frequency band, which is a frequency band in the first frequency bands other than the usable frequency bands, as extended communication quality information after determination of the usable frequency bands by the wireless-channel control unit,
the wireless-channel control unit adds frequency bands determined as being unused based on the extended communication quality information, as the usable frequency bands, and
the extended-quality-information acquisition unit acquires the extended communication quality information for every constant period determined based on at least one of the extended frequency band and a traffic amount of the second communication device.

* * * * *